United States Patent
Choi et al.

(10) Patent No.: US 11,494,151 B2
(45) Date of Patent: Nov. 8, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Hyerin Choi, Suwon-si (KR); Changhoon Son, Suwon-si (KR); Jongkil Sun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/921,228

(22) Filed: Jul. 6, 2020

(65) Prior Publication Data

US 2021/0224017 A1 Jul. 22, 2021

(30) Foreign Application Priority Data

Jan. 20, 2020 (KR) .................... 10-2020-0007548

(51) Int. Cl.
*G06F 3/0484* (2022.01)
*G06F 3/14* (2006.01)
(Continued)

(52) U.S. Cl.
CPC .......... *G06F 3/1446* (2013.01); *G06F 3/0484* (2013.01); *G06K 7/10366* (2013.01); *G06K 7/1413* (2013.01); *G06K 7/1417* (2013.01)

(58) Field of Classification Search
CPC .. G06F 3/1446; G06F 3/04842; G06F 3/0484; G06K 7/10366; G06K 7/1413
See application file for complete search history.

(56) References Cited

U.S. PATENT DOCUMENTS 10,338,874 B2 7/2019 Rycyna, III et al.
2013/0293443 A1 11/2013 Seo et al.
(Continued)

FOREIGN PATENT DOCUMENTS

JP 6415046 10/2018
KR 10-1488809 2/2015
(Continued)

OTHER PUBLICATIONS

International Search Report and Written Opinion of the International Search Report dated Oct. 21, 2020 in International Patent Application No. PCT/KR2020/009008.

*Primary Examiner* — Nelson M Rosario
*Assistant Examiner* — Scott D Au
(74) *Attorney, Agent, or Firm* — Staas & Halsey LLP

(57) ABSTRACT

An electronic apparatus and method of controlling same are provided. The electronic apparatus includes a sensor, a display, a memory configured to store module map information in which identification information of a plurality of display modules included in a display panel and location information of the plurality of display modules is mapped, respectively, and a processor configured to, based on scanned identification information corresponding to one of the plurality of display modules being received from the sensor, obtain location information of a display module corresponding to the received scanned identification information based on the module map information stored in the memory, and control the display to display the obtained location information of the display module.

16 Claims, 10 Drawing Sheets

(51) Int. Cl.
*G06K 7/10* (2006.01)
*G06K 7/14* (2006.01)

(56) References Cited

U.S. PATENT DOCUMENTS

| | | |
|---|---|---|
| 2014/0281758 A1 | 9/2014 | Klein et al. |
| 2016/0034240 A1* | 2/2016 | Kreiner ................. G09G 5/003 348/383 |
| 2016/0224306 A1* | 8/2016 | Rycyna, III ........... G06F 3/1446 |
| 2017/0294053 A1* | 10/2017 | Kao ................. G06K 19/06037 |
| 2019/0179592 A1 | 6/2019 | Hyeon |
| 2019/0384560 A1 | 12/2019 | Seo et al. |
| 2020/0133615 A1 | 4/2020 | Kim et al. |
| 2020/0348898 A1 | 11/2020 | Son |

FOREIGN PATENT DOCUMENTS

| | | |
|---|---|---|
| KR | 10-1548351 | 8/2015 |
| KR | 10-2016-0078750 | 7/2016 |
| KR | 10-2017-0116619 | 10/2017 |
| KR | 10-1957241 B1 | 3/2019 |
| KR | 10-2019-0053032 A | 5/2019 |
| KR | 10-2019-0141384 A | 12/2019 |
| KR | 10-2020-0047185 A | 5/2020 |

\* cited by examiner

ELECTRONIC APPARATUS AND CONTROLLING METHOD THEREOF

CROSS-REFERENCE TO RELATED APPLICATIONS

This application claims priority from Korean Patent Application No. 10-2020-0007548, filed in the Korean Intellectual Property Office on Jan. 20, 2020, the disclosure of which is incorporated herein by reference.

BACKGROUND

1. Field

Aspects of the exemplary embodiments relate to an electronic apparatus and a controlling method thereof and more particularly, to an electronic apparatus that provides information regarding a plurality of display modules and a controlling method thereof.

2. Description of the Related Art

Recently, with the development of electronic technology, various types of display devices have been developed and distributed, and the demand for large display devices has increased.

In particular, a modular display device for connecting a plurality of display modules to each other to manufacture one large display device has been developed and distributed. However, it is difficult to identify the location of a specific module from among the plurality of display modules, and it is difficult to maintain a management history of each of the plurality of display modules.

Conventionally, a management number is assigned to each of a plurality of display modules and it is maintained by handwriting, but considering that the main installation environment of a large display device is a narrow passageway in the rear of the device, which is usually dark, it is very difficult to find a specific module in which an error occurs using a management number written by hand.

Accordingly, there was a demand for a method for finding a specific module from among a plurality of modules in a display device conveniently.

SUMMARY

An aspect of the present disclosure relates to an electronic apparatus that provides location information of each of a plurality of display modules constituting a display device and a controlling method thereof.

An electronic apparatus according to an embodiment includes a sensor, a display, a memory configured to store module map information in which identification information of each of a plurality of display modules included in a display panel and location information of each display module is mapped, and a processor configured to, based on identification information obtained by scanning identification information corresponding to one of the plurality of display modules being received from the sensor, obtain location information of a display module corresponding to the received identification information based on the module map information stored in the memory, and control the display to display the obtained location information.

A controlling method of an electronic apparatus including module map information in which identification information of each of a plurality of display modules included in a display panel and location information of each display module is mapped may include, based on identification information obtained by scanning identification information corresponding to one of the plurality of display modules being received from the sensor, obtaining location information of a display module corresponding to the received identification information based on the module map information stored in the memory, and displaying the obtained location information.

DETAILED DESCRIPTION

Figure 1:
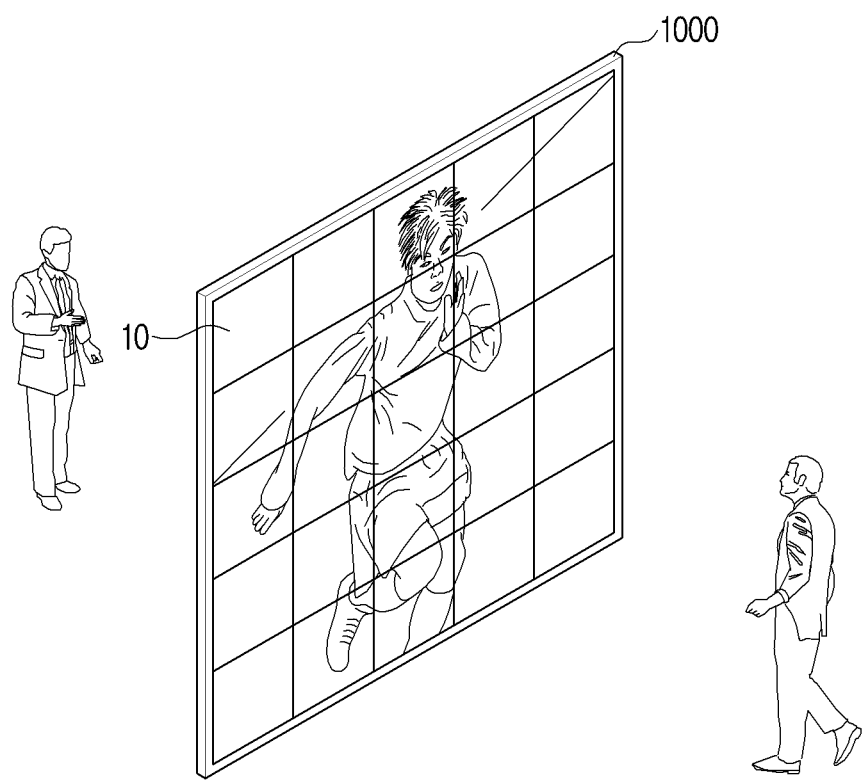
FIG. 1 is a view provided to schematically explain configuration of a display device according to an embodiment.

The terms used in this specification will be described briefly, and then the exemplary embodiments will be described in detail.

As for the terms used in the embodiments of the disclosure, general terms that are currently used widely were selected in consideration of the functions described in the disclosure. However, the terms may vary depending on the intention of those skilled in the art who work in the pertinent field, previous court decisions or emergence of new technologies. Also, in particular cases, there may be terms that were designated by the applicant, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

The terms, "first", "second", or the like, may be used to indicate various components, and they should not limit the components to the terms. The terms are used only in order to distinguish one component from the other components.

Singular forms are intended to include plural forms unless the context clearly indicates otherwise. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the present disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor (not illustrated) except for 'modules' or 'units' that should be realized in a specific hardware.

The example embodiments of the disclosure will be described in greater detail below in a manner that will be understood by one of ordinary skill in the art. However, exemplary embodiments may be realized in a variety of different configurations, and not limited to descriptions provided herein. Also, in order to describe the present disclosure clearly, irrelevant descriptions have been omitted and throughout the specification, similar reference numbers are used for similar parts.

FIG. 1 is a view provided to schematically explain configuration of a display device according to an embodiment.

Referring to FIG. 1, a display apparatus 1000 according to an embodiment displays video data. The display apparatus 1000 may be implemented as a TV, but is not limited thereto, and any apparatus equipped with a display function such as a video wall, a large format display (LFD), digital signage, a digital information display (DID), a projector display, etc. can be applied without limitation. Also, the display apparatus 1000 may be implemented as displays in various forms such as a liquid crystal display (LCD), an organic light-emitting diode (OLED), liquid crystal on silicon (LCoS), digital light processing (DLP), a quantum dot (QD) display panel, quantum dot light-emitting diodes (QLED), micro light-emitting diodes (pLED), mini LED, etc.

The display apparatus 1000 according to an embodiment may be configured to include a plurality of display modules 10. For example, as illustrated in FIG. 1, the plurality of display modules 10 may be combined to implement one display apparatus 1000.

Meanwhile, the display apparatus may include a plurality of cabinets, and each of the plurality of cabinets may include the plurality of display modules 10. Here, the cabinet may be a unit that refers to the plurality of display modules 10. For example, the display apparatus 1000 may include an LED cabinet or an array of LEDs including a plurality of LED elements on a front surface. Each of the plurality of display modules 10 according to an embodiment may include a plurality self-light emitting elements. Here, the self-light emitting elements may be at least one of an LED or a micro LED. Here, the micro LED is an LED of about 5 to 100 micrometers in size and a micro light emitting element that emits light without a color filter.

FIG. 1 a view provided to explain a front surface of the display apparatus 1000 according to an embodiment. The display apparatus 1000 according to an embodiment may be implemented as a video wall, a large format display (LFD), digital signage, etc., and may be installed in a public place, a commercial place, etc. The display apparatus 1000 may provide information, entertainment, advertisements, and the like to unspecified persons. Meanwhile, as the size of the display apparatus 1000 increases, the display apparatus 1000 may include the plurality of display modules 10.

Hereinafter, as the number of the display modules 10 provided in the display apparatus 1000 increases, various embodiments for providing a method of tracking each of the plurality of display modules 10 and a method of managing a repair history, etc. of each of the plurality of display modules by an electronic apparatus (not illustrated) for efficient maintenance, repair, management, etc. of the plurality of display modules 10 will be described.

Figure 2:
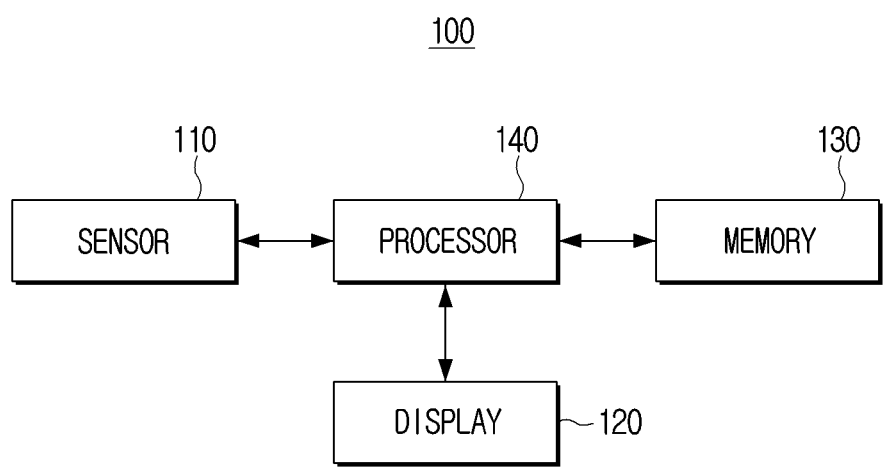
FIG. 2 is a block diagram provided to explain configuration of an electronic apparatus according to an embodiment.

FIG. 2 is a block diagram provided to explain configuration of an electronic apparatus according to an embodiment.

Referring to FIG. 2, an electronic apparatus 100 according to an embodiment includes a sensor 110, a display 120, a memory 130 and a processor 140.

The sensor 110 is configured to obtain data by scanning a peripheral area of the electronic apparatus 100. For example, the sensor 110 may include a camera, a reader, and the like.

For example, the sensor 110 may be implemented as a camera, and may obtain image data by photographing one area including identification information provided in the display modules 10. For instance, the processor 110 may obtain unique identification information of the display modules 10 based on the image data received from the sensor 100.

As another example, the sensor 110 may be implemented as a reader, and may obtain data by scanning one area including identification information provided in the display module 10. Here, the identification information may include at least one of an identification code or an identification number provided on a rear surface of each of the plurality of display modules 10. For example, the identification code may refer to a Quick Response (QR) Code, a Barcode, and the like. The identification number may refer to a serial number, and the like. In other words, each of the plurality of display modules 10 may have different unique identification information, which will be described in detail with reference to FIG. 3. While the identification information is discussed as being provided on rear surface(s) or side(s) of the plurality of display module(s) 10, the present invention is not limited to any particular area and the identification information may be provided at any location.

As another example, the sensor 110 may be implemented as a radio frequency identification (RFID) reader. For example, the sensor 110 may obtain identification information of each of the plurality of display modules 10 through tagging. Meanwhile, the implementation example of the sensor 110 described above is for convenience of explanation, and it is not limited thereto. For example, the sensor 110 may be implemented as various components capable of acquiring identification information of the display modules 10. The sensor 110 may obtain identification information of each of the plurality of display modules 10 by performing wired or wireless communication with each of the plurality of display modules 10.

The display 120 may be implemented as a display including a self-light emitting element or a display including a non-light emitting element and a backlight. For example, the display 120 may be implemented as various types of displays such as Liquid Crystal Display (LCD), Organic Light Emitting Diodes (OLED) display, Light Emitting Diodes (LED), micro LED, mini LED, Plasma Display Panel (PDP), Quantum dot (QD) display, Quantum dot light-emitting diodes (QLED), etc. The display 120 may also include a driving circuit, a backlight unit, etc. which can be implemented in the form of an a-si TFT, a low temperature poly silicon (LTPS) TFT, an organic TFT (OTFT), etc. Meanwhile, the display 120 may be implemented as a touch screen, a flexible display, a rollable display, a 3D display, a display in which a plurality of display modules are physically connected, etc. The display 120 according to an embodiment may display various types of contents under the control of the processor 140.

The memory 130 may store data required for various embodiments of the present disclosure. The memory 130 may be implemented in the form of a memory embedded in the electronic apparatus 100 according to a data storage purpose, or may be implemented in the form of a memory detachable from the electronic apparatus 100. For example, in the case of data for driving the electronic apparatus 100, the data may be stored in a memory embedded in the electronic apparatus 100, and in the case of data for an expansion function of the electronic apparatus 100, the data may be stored in a memory detachable from the electronic apparatus 100. Meanwhile, the memory embedded in the electronic apparatus 100 may be implemented as at least one of a volatile memory (e.g., dynamic RAM (DRAM), static RAM (SRAM), or synchronous dynamic RAM (SDRAM, and the like), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), hard drive, or sold state drive (SSD), and the memory detachable from the terminal device 100 may be implemented in the form of a memory card (e.g., compact flash (CF), secure digital (SD), micro secure digital (Micro-SD), mini secure digital (Mini-SD), extreme digital (xD), multi-media card (MMC), etc.), an external memory connectable to a USB port (e.g., a USB memory), and the like.

The memory 130 according to an embodiment may store at least one instruction or a computer program including instructions to control the electronic apparatus 100.

Meanwhile, in the above-identified embodiment, it is described that various data is stored in the external memory 130 of the processor 140, but at least part of the above-described data may be stored in an internal memory of the processor 140 according to an embodiment of at least one of the electronic apparatus 100 or the processor 140.

In particular, the memory 130 according to an embodiment may store identification information of each of the plurality of display modules 10 included in a display panel of the display apparatus 1000 and module map information in which the location information of the display modules 10 is mapped.

The processor 140 is electrically connected to the memory 130 and controls the overall operations of the electronic apparatus 100. Here, the processor 140 may consist of one or a plurality of processors. Specifically, the processor 140 may perform the operations of the electronic apparatus 100 according to various embodiments of the present disclosure by executing at least one instruction stored in the memory 130.

According to an embodiment, the processor 140 may be implemented as a digital signal processor (DSP) processing a digital signal, a microprocessor, a Graphics Processing Unit (GPU), an Artificial Intelligence (AI) processor, a Neural Processing Unit (NPU), or a time controller (TCON). However, the disclosure is not limited thereto, and the processor 140 may include one or more of a central processing unit (CPU), a micro controller unit (MCU), a micro processing unit (MPU), a controller, an application processor (AP) or a communication processor (CP), or an ARM processor, or may be defined as the corresponding term. In addition, the processor 140 may be implemented by a system-on-chip (SoC) or a large scale integration (LSI) in which a processing algorithm is embedded, or may be implemented in an application specific integrated circuit (ASIC) form or in a field programmable gate array (FPGA) form.

In particular, the processor 140 according to an embodiment, when identification information obtained by scanning identification information corresponding to one of the plurality of display modules 10 is received from the sensor 110, may obtain location information of the display module 10 corresponding to the received identification information based on the module map information stored in the memory 130. Subsequently, the processor 140 may control the display 120 to display the obtained location information, which will be described in detail with reference to FIG. 3.

Figure 3:
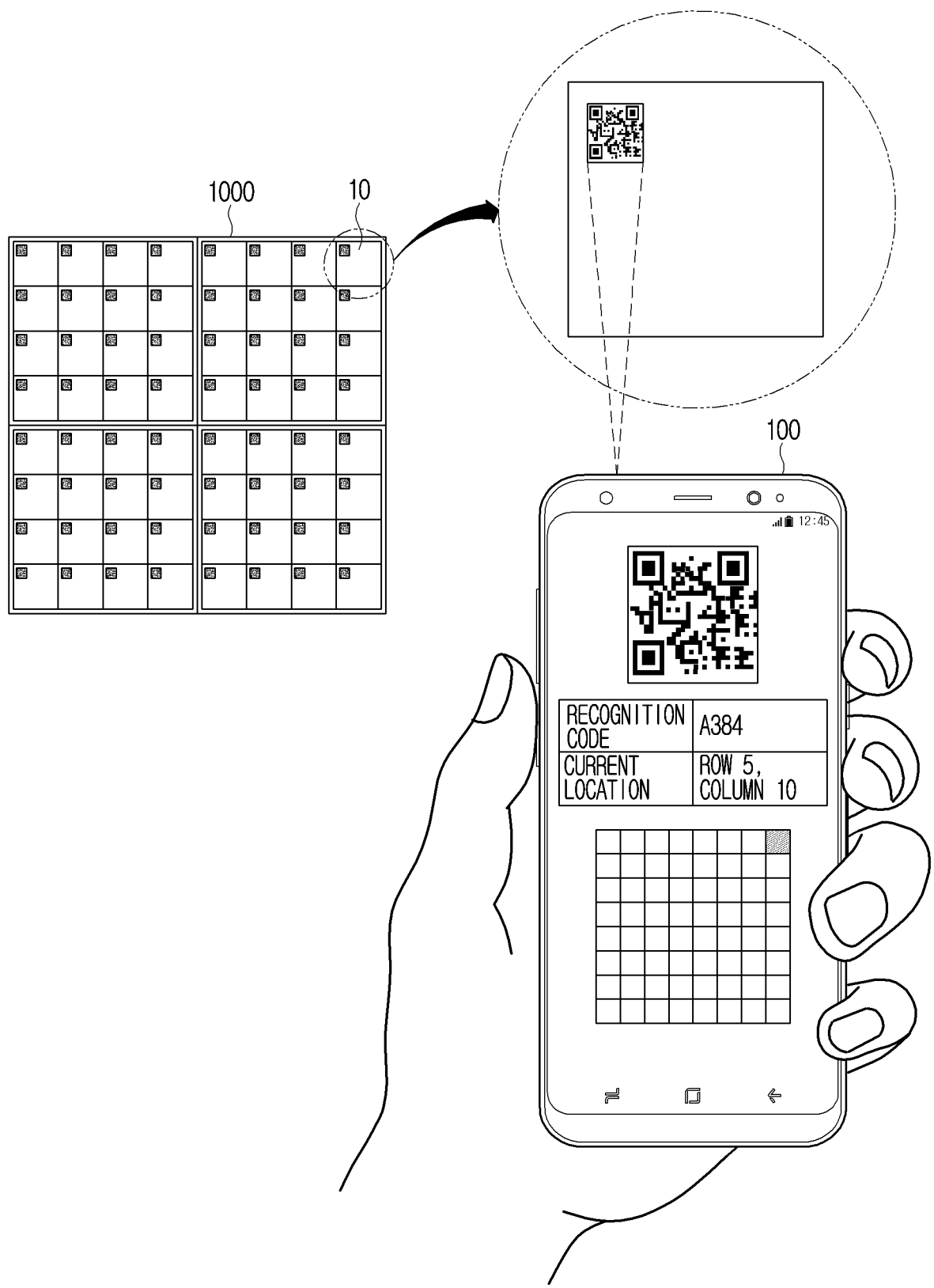
FIG. 3 is a view provided to explain identification information and location information according to an embodiment.

FIG. 3 is a view provided to explain identification information and location information according to an embodiment.

FIG. 3 illustrates a rear surface of a display panel of the display apparatus 1000 for convenience of explanation.

Identification information may be provided on the rear surface of each of the plurality of display modules 10 included in the display panel. Here, the identification information may be a unique identification (ID) assigned to the corresponding display module 10 in the manufacturing step of the display module 10 such as an identification code or an identification number. However, this is only an example, and the identification information may be a unique ID assigned to the corresponding display module 10 according to the user's setting, and the identification information may be changed according to the user's setting.

The sensor 110 provided in the electronic apparatus 100 according to an embodiment may scan identification information provided in one of the plurality of display modules 10 and transmit the identification information to the processor 140.

Subsequently, when the identification information is received from the sensor 110, the processor 140 may obtain location information of the display module 10 corresponding to the received identification information based on module map information. Here, the module map information may mean information in which the identification information of the plurality of display modules 10 is mapped with the location information of each display module 10.

The plurality of display modules 10 included in the display panel according to an embodiment may be arranged in the form of matrix. Here, the location information may mean row and column information of the location of a specific display module in the plurality of display modules 10.

The display apparatus 1000 according to an embodiment may include a plurality of areas in which a plurality of cabinets may be mounted and fixed. In addition, each of the plurality of cabinets may include a plurality of areas in which each of the plurality of display modules 10 may be mounted and fixed. Referring to FIG. 3, the display panel of the display apparatus 1000 is implemented by mounting and fixing four cabinets, and it is illustrated that each of the plurality of cabinets may be mounted and fixed with sixteen display modules, but is not limited thereto. The number, size, etc. of the display modules 10 included in the display panel may vary according to the size, purpose, embodiment, etc. of the display apparatus 1000.

Referring to FIG. 3, the processor 140 according to an embodiment may identify a specific display module corresponding to identification information received from the sensor 110 from among the plurality of display modules 10. Subsequently, the processor 140 may provide location information of the identified display module based on module map information. For example, if the identified display module is a display module located at the top right end of the plurality of display modules 10, the processor 140 may provide the location information of the identified display module based on the module map information. For example, the processor 140 may provide, as row and column information, the location information of the identified display module from among the plurality of display modules 10 arranged in a matrix form.

Referring to FIG. 3, the processor 140 may visually provide the location of each of the plurality of display modules 10 and the location of the identified display module. For example, the processor 140 may provide an area corresponding to the identified display module in a different color, brightness, etc. from the areas corresponding to the remaining display modules.

Meanwhile, the processor 140 according to an embodiment may control the display 120 to display information regarding an operation of the identified display module. For example, the processor 140 may request information regarding an operation of a display module corresponding to identification information from an external server based on identification information received through the sensor 110. Subsequently, the processor 140 may provide the information regarding an operation, which is received according to the request.

Here, the operation-related information may include various information regarding maintenance, repair, management, etc. of the corresponding display module, such as whether the display module is operated normally, an installation history, a recent inspection history, or a driving time.

Figure 4:
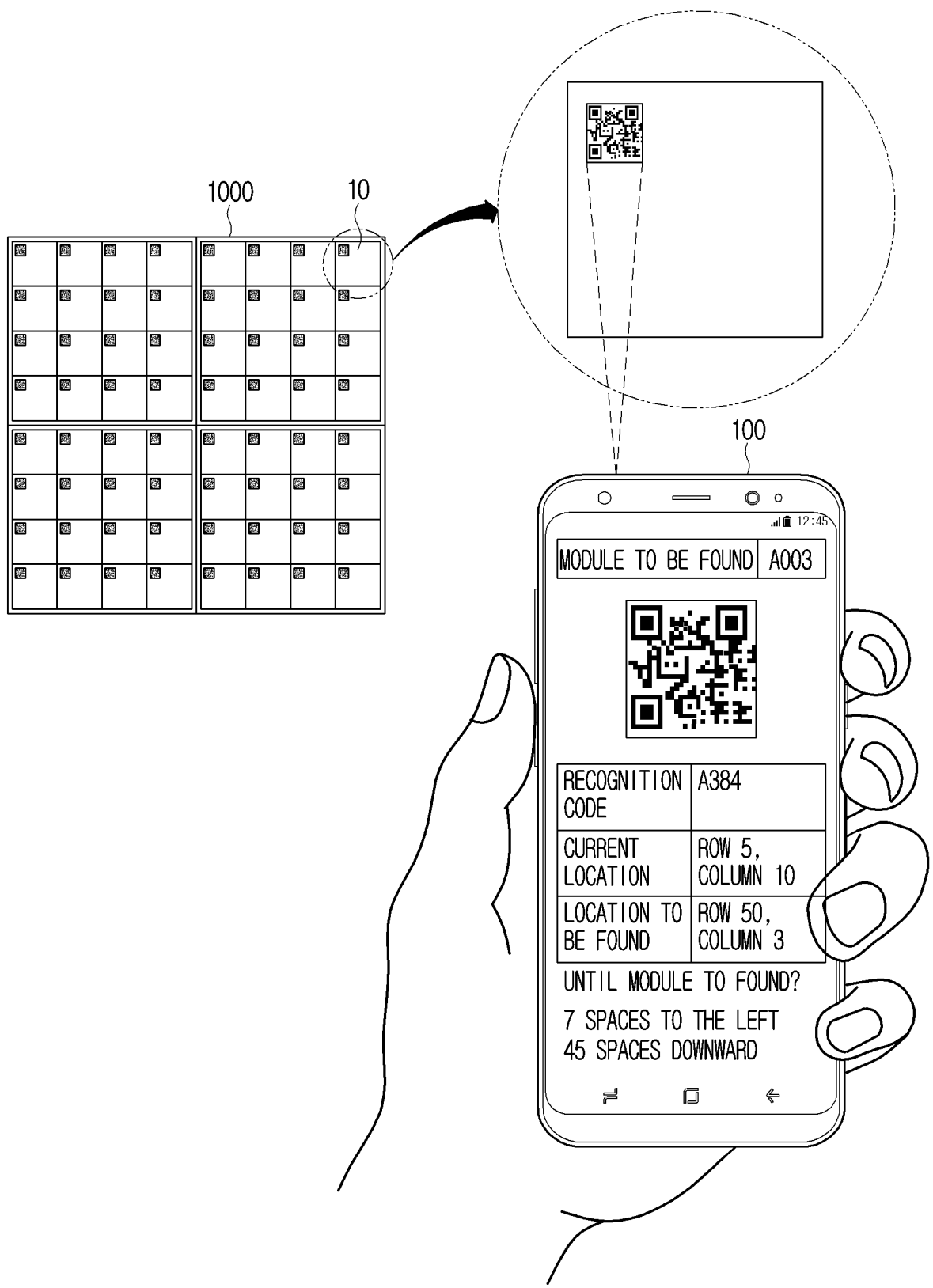
FIG. 4 is a view provided to explain guide information according to an embodiment.

FIG. 4 is a view provided to explain guide information according to an embodiment.

Referring to FIG. 4, the processor 140 according to an embodiment may control the display 120 to display location information of a target display module from among the plurality of display modules 10.

Here, the target display module may refer to a specific display module that satisfies a predetermined condition from among the plurality of display modules 10. For example, the target display module may refer to a display module to be found, a display module in which an error is detected, a display module in which an inspection period for maintenance and repair has arrived, etc. according the user's purpose. However, this is only an example, and one of the plurality of display modules 10 may be set as a target display module according to various conditions, purposes, etc. For example, the target display module may be set by inputting the location of the display module desired by the user in a row and column form, or the target display module may be set by inputting the identification number of the display module desired by the user.

The processor 140 according to an embodiment may display identification information of the target display module. Referring to FIG. 4, the target display module may refer to a specific display module that the user wishes to find from among the plurality of display modules 10, and the processor 140 may display identification information regarding the desired module (e.g., at least one of an identification number such as A003 or an identification code such as QR code).

The processor 140 according to an embodiment may display location information corresponding to the identification information received from the sensor 110. FIG. 4 illustrates that the identification information received from the sensor 110 is a recognition code (e.g., A384), and location information corresponding to the identification information is the current location for convenience of explanation. However, this is an arbitrary example for convenience of explanation, and the present disclosure is not limited thereto.

Meanwhile, the processor 140 according to an embodiment may obtain location information of the target display module based on module map information. Subsequently, the processor 140 may display guide information including direction information and distance information to the location of the target display module with reference to the location (e.g., the current location) corresponding to the identification information received from the sensor 110.

For example, as the number of the display modules 10 included in the display panel increases in proportion to the size of the display apparatus 1000, it would be difficult to search one of the plurality of display modules 10 or to manage the repair history of each of the plurality of display modules 10.

The processor 140 may provide the location of one display module sensed through the sensor 110 as the current location, and provide the location of the target display module as the location to be found (or a target location). In addition, the processor 140 may provide an optimal course for moving from the current location to the target location. For example, referring to FIG. 4, the processor 140 may display the location of the display module corresponding to the identification information received through the sensor 110 (hereinafter, referred to as the current display module) (e.g., row 5 and column 10), and the location of the target display module (row 50 and column 3). Subsequently, the processor 140 may display a difference in location between the current display module and the target display module. Referring to FIG. 4, the difference in location between the current display module and the target display module is row 45 and column 7, and the processor 140 may notify the user that the target display module can be reached by moving 7 spaces to the left and 45 spaces to the bottom based on the difference.

Figure 5:
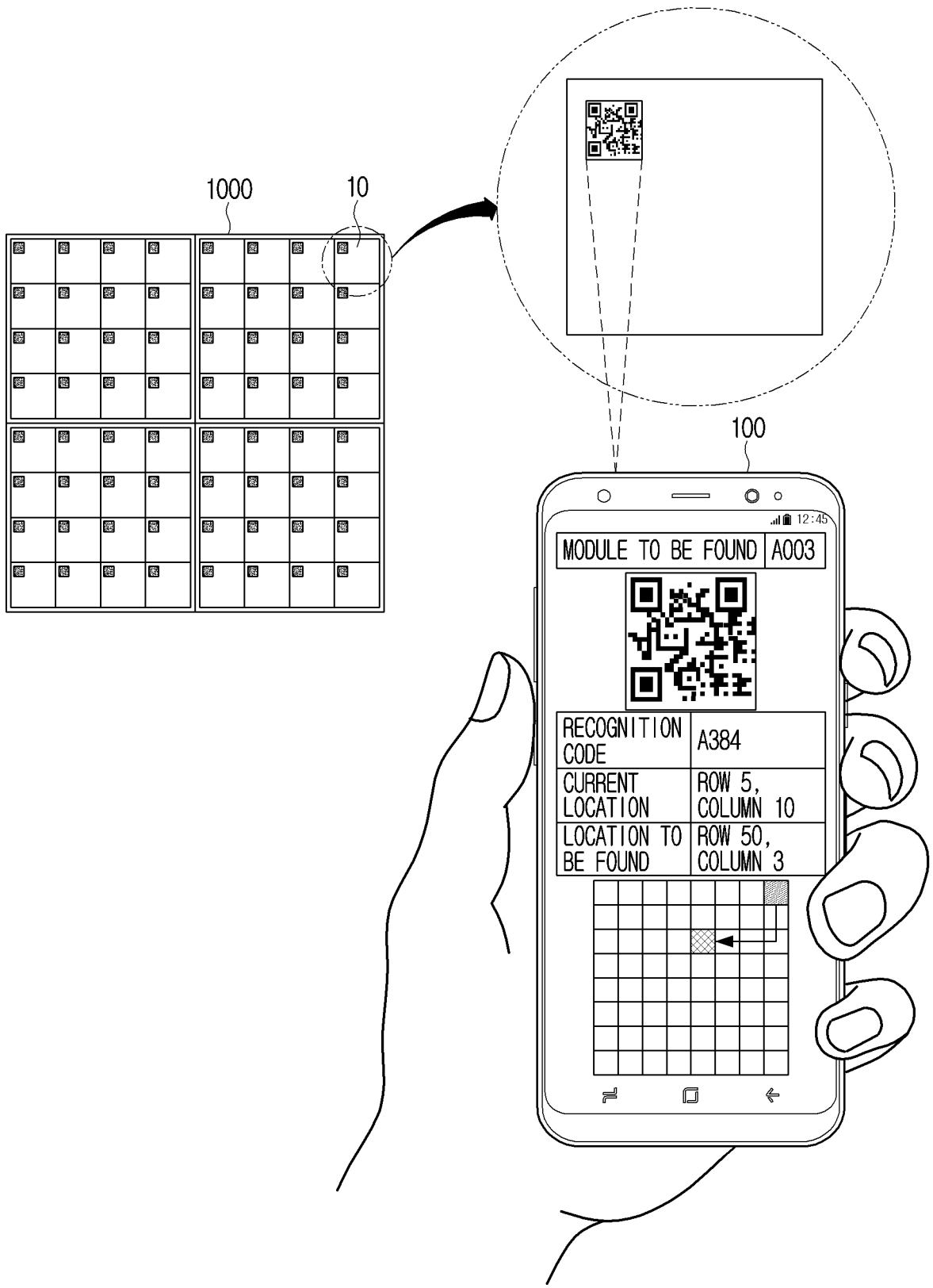
FIG. 5 is a view provided to explain guide information according to an embodiment.

FIG. 5 is a view provided to explain guide information according to an embodiment.

The processor 140 according to an embodiment may visually provide the location of each of the plurality of display modules, the location of the identified display module and the location of the target display module. For example, the processor 140 may provide direction information and distance information for moving from the location of the current display module to the location of the target display module in a text form as illustrated in FIG. 4 or visually (graphically) as illustrated in FIG. 5.

Referring to FIG. 5, the processor 140 may provide an area corresponding to the location of the current display module and the location of the target display module in a different color, brightness, etc. from the areas corresponding to the remaining display modules. In addition, the processor 140 provide an optimum moving path (e.g., an arrow, etc.) for moving from the location of the current display module to the location of the target display module. However, this is only an example, and the present disclosure is not limited thereto. For example, the processor 140 may provide the location of the current display module and the location of the target display module in various forms that can be recognized by the user.

Figure 6:
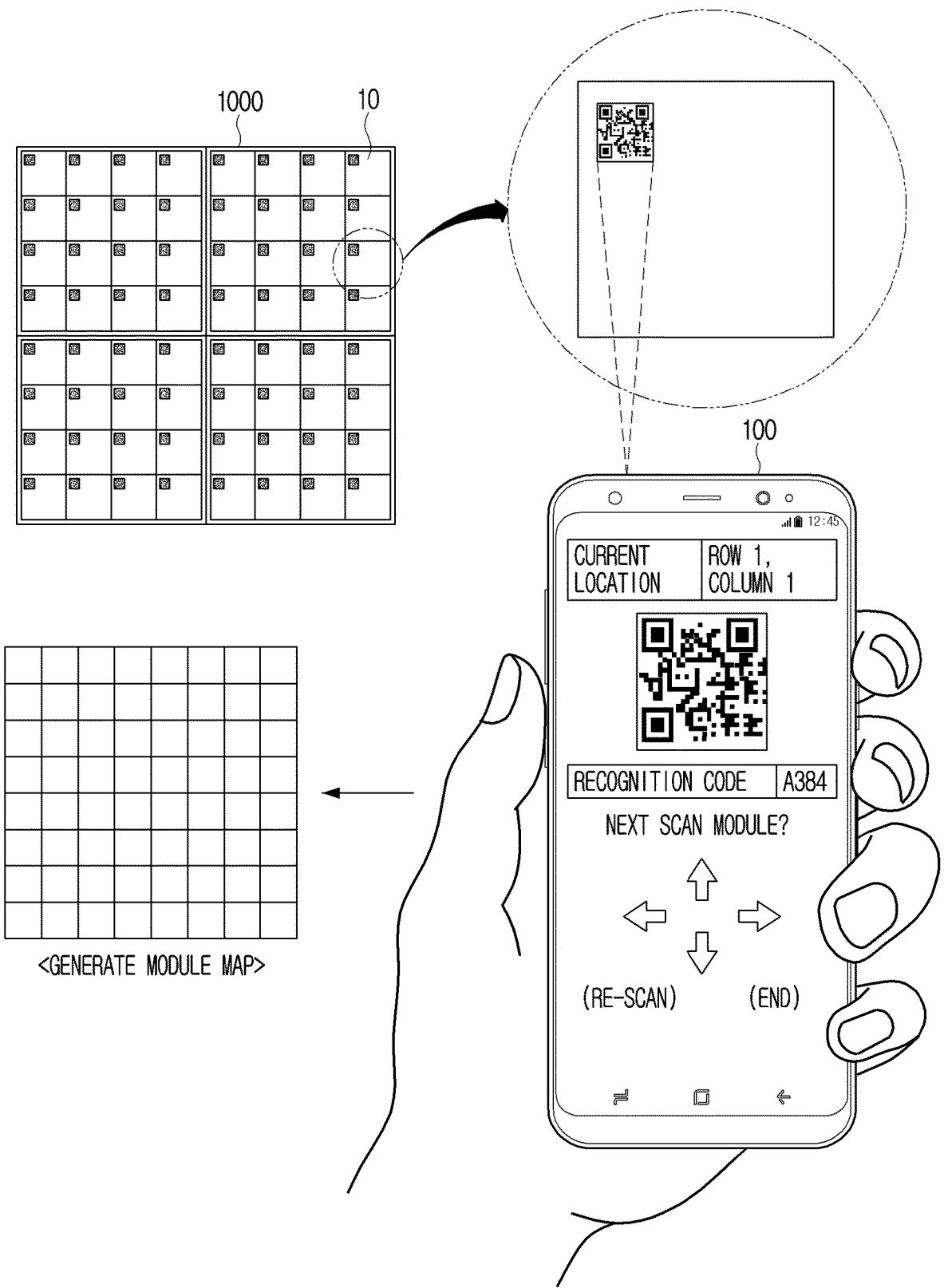
FIG. 6 is a view provided to explain a UI including four direction buttons according to an embodiment.

FIG. 6 is a view provided to explain a UI including four direction buttons according to an embodiment.

Referring to FIG. 6, the processor 140 according to an embodiment may generate and update module map information.

For example, the processor 140 may control the display 120 to display a UI including four direction buttons of up, down, left, and right. Subsequently, after one of the four direction buttons is input, if identification information obtained by scanning identification information of a specific display module is received from the sensor 110, the location information of the specific display module may be obtained based on the location information of the current display module and the direction information of the input direction button.

For example, it is assumed that the location information of the current display module is row 1 and column 1, and a right direction button from among the four direction buttons is input. Subsequently, if identification information of a specific display module is received from the sensor 110, the processor 140 may identify that the specific display module is located at row 1 and column 2 and obtain row 1 and column 2 as the location information. As another example, it is assumed that the location information of the current display module is row 1 and column 1, and a down direction button from among the four direction buttons is input. Subsequently, if identification information of a specific display module is received from the sensor 110, the processor 140 may identify that the specific display module is located at row 2 and column 2, and obtain row 2 and column 1 as the location information. The processor 140 may map the obtained location information with the identification information of the specific display module received from the sensor 110 to update and store module map information.

Meanwhile, this is only an example, and the present disclosure is not limited thereto. For example, the electronic apparatus 100 may further include a communication interface (not illustrated) including a circuit that performs communication with the display apparatus 1000. The electronic apparatus 100 may receive module map information in which identification information of each of the plurality of display modules included in a display panel and location information of each display module is mapped from the display apparatus 1000 and store the module map information in the memory 130. As another example, the electronic apparatus 100 may receive module map information corresponding to the display apparatus 1000 from a server (not illustrated) and store the module map information.

As yet another example, the processor 140 may obtain first module map information corresponding to some display modules from among the plurality of display modules 10, and receive second module map information corresponding to the remaining display modules from an external device (e.g., the display apparatus 1000, a server, another user terminal device, etc.). Subsequently, the processor 140 may obtain module map information corresponding to a plurality of display modules included in a display panel by integrating the first module map information and the second module map information, which will be described in detail with reference to FIG. 7.

Figure 7:
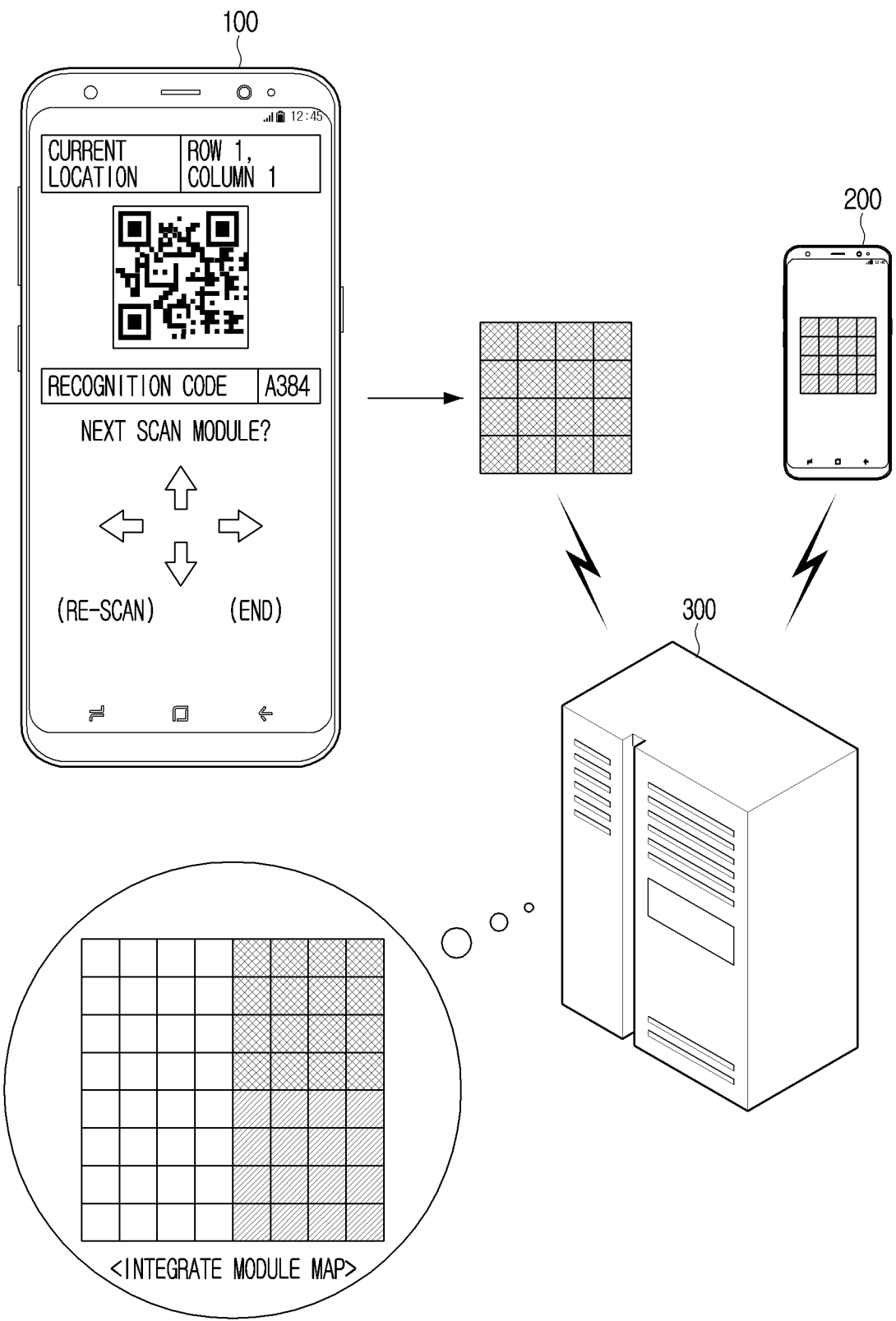
FIG. 7 is a view provided to explain a method of integrating module map information according to an embodiment.

FIG. 7 is a view provided to explain a method of integrating module map information according to an embodiment.

Referring to FIG. 7, the module map information may be information obtained by integrating the first module map information including location information of some display modules from among the plurality of display module 10 that are obtained by the electronic apparatus 100 and the second module map information including location information of the remaining display modules from among the plurality of display modules 10 that are obtained by another electronic apparatus 200.

For example, it is assumed that when the display apparatus 1000 is installed, some of the plurality of display modules are installed by a first worker, and the remaining display modules are installed by a second worker. In this case, the electronic apparatus 100 of the first worker may generate the first module map information in which installation of some display modules is mapped with identification information and location information of each of the corresponding some display modules. In addition, the another electronic apparatus 200 of the second worker may generate the second module map information in which installation of the remaining display modules is mapped with identification information and location information of each of the corresponding remaining display modules.

Here, the second module map information is transmitted to an external server 300, and the electronic apparatus 100 may receive the second module map information from the external server 300 through a communication interface (not illustrated) provided in the electronic apparatus 100. Subsequently, the electronic apparatus 100 may obtain module map information by integrating the first module map information including location information regarding some display modules and the second module map information including location information regarding the remaining display modules received from the external server 300. Meanwhile, this is only an example, and the present disclosure is not limited thereto.

For example, as illustrated in FIG. 7, the external server 300 may receive the first module map information and the second module map information from the electronic apparatus 100 and another electronic apparatus 200, respectively, and obtain the module map information by integrating the received first and second module map information.

Subsequently, the processor 140 may receive the module map information from the external server 300 and store the module map information.

Accordingly, the processor 140 according to an embodiment may control the display 120 to display a UI screen including at least one of a UI item for transmitting the module map information to the external server 300, a UI item for receiving the module map information from the external server 300, a UI item for updating the module map information, or a UI item for providing location information of a specific display module from among a plurality of display modules.

Here, the UI item for updating the module map information may provide a screen for generating and updating the module map information by mapping the identification information obtained by scanning through the sensor 110 and the location information obtained based on a use input regarding the four direction buttons.

In addition, the UI item for providing location information of a specific display module from among a plurality of display modules may provide guide information including location information regarding where a display module corresponding to the information obtained by scanning through the sensor 110 is located in the plurality of display modules 10, and direction information and distance information regarding a location of a target display module with reference to a location of a current display module.

Figure 8:
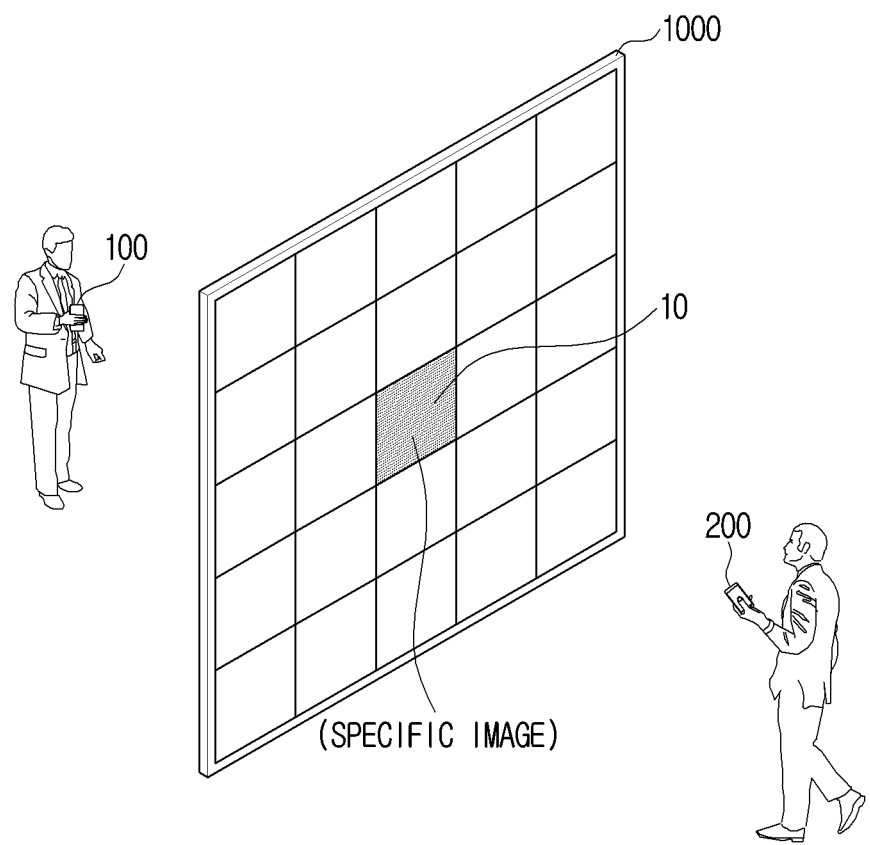
FIG. 8 is a view provided to explain a method of displaying a specific image according to an embodiment.

FIG. 8 is a view provided to explain a method of displaying a specific image according to an embodiment.

Referring to FIG. 8, the electronic apparatus 100 according to an embodiment further includes a communication interface for performing communication with the display apparatus 1000, and the processor 140 may control the communication interface to transmit a signal for controlling the display apparatus 1000 so that a display module corresponding to the identification information received from the sensor 10 from among the plurality of display modules 10 displays a specific image.

According to an embodiment, it is assumed that the display apparatus 1000 is implemented as a digital signage and disposed in an external public place. A specific user (or a manager of the display apparatus 1000) may sense identification information of a specific display module from among the plurality of display modules 10 using the electronic apparatus 100 in order to complement and maintain the display apparatus 1000 from a rear side of the display apparatus 1000.

In this case, the electronic apparatus 100 may transmit a control signal for the specific display module to the display apparatus 1000 so that the specific display module sensed through the electronic apparatus 100 from among the plurality of display modules 10 displays a different image from the remaining display modules in order for smooth communication between a user located at the rear side of the display apparatus 1000 and a user located at the front side of the display apparatus 100 and for allowing the user located at the front side to visually recognize the location of the display module that the user located at the rear side is working on (or repairing).

In addition, the electronic apparatus 100 according to an embodiment may perform communication with another electronic apparatus 200 and transmit identification information, location information, etc. of a specific display module sensed through the electronic apparatus 100 to another electronic apparatus 200.

As another example, another electronic apparatus 200 may transmit identification information, location information, etc. of a specific display module to the electronic apparatus 200. The electronic apparatus 100 may set a target display module based on identification information of a specific display module received from another electronic apparatus 200, and control the display 120 to display at least one of direction information or distance information regarding the location of the target display module from the location of the current display module.

Figure 9:
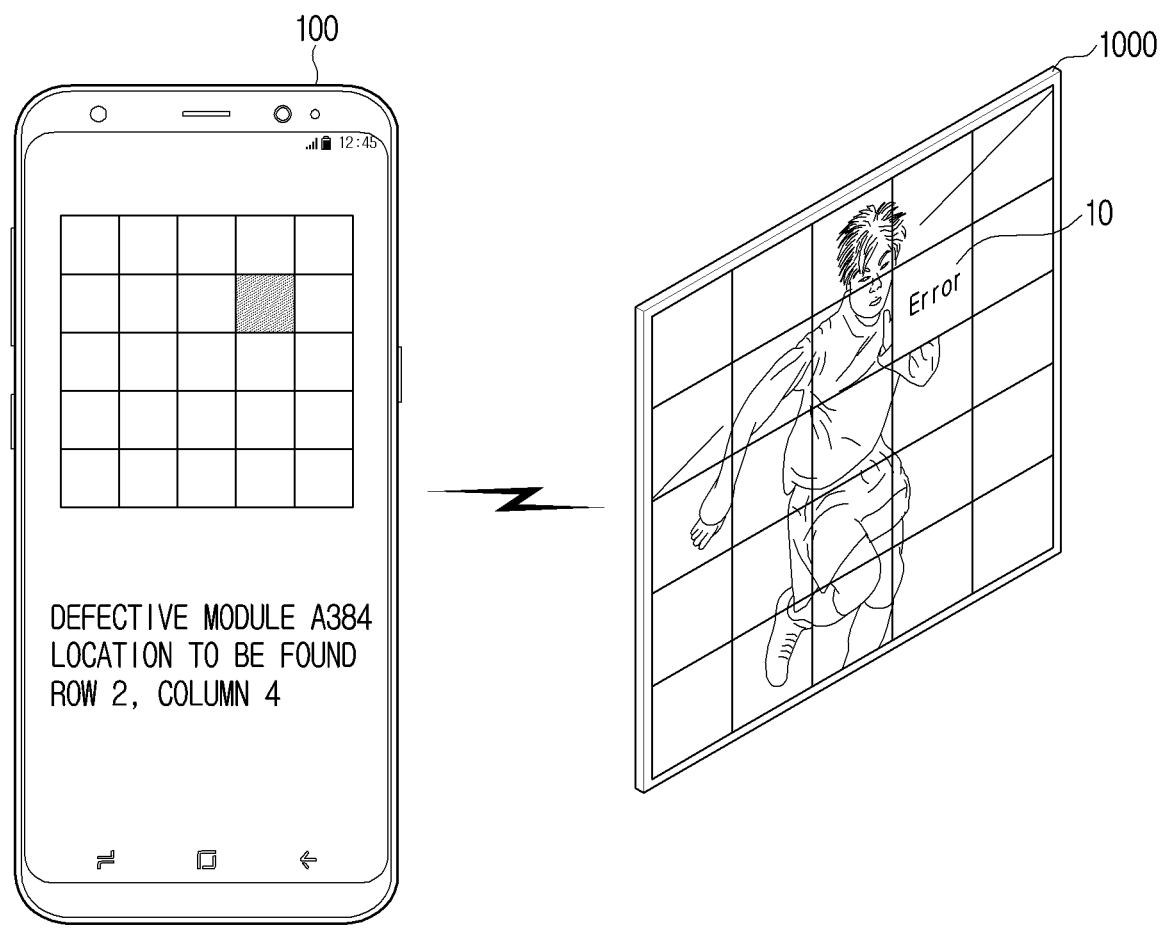
FIG. 9 is a view provided to explain a method of identifying a module in which an error occurs according to an embodiment.

FIG. 9 is a view provided to explain a method of identifying a module in which an error occurs according to an embodiment.

Referring to FIG. 9, when location information regarding a module in which an error occurs from among the plurality of display modules 10 is received from a display panel through a communication interface (not illustrated) including a circuit, the processor 140 according to an embodiment may identify the received location information as location information of a target display module.

For example, the processor 140 may perform communication with the display apparatus 1000 and receive identification information regarding a display module in which an error occurs from among the plurality of display modules 10 included in the display apparatus 1000. Subsequently, the processor 140 may identify a target display module corresponding to the received identification information and location of the target display module based on module map information. Then, the processor 140 may control the display 120 to display identification information and location information of the target display module.

For example, the processor 140 may provide the location information visually by shading a specific area based on location information of the target display module from among the plurality of display modules.

Referring back to FIG. 2, the electronic apparatus 100 according to an embodiment may further include a communication interface (not illustrated), an input unit (not illustrated) and an output unit (not illustrated).

The communication interface receives various types of contents. For example, the communication interface may receive various types of contents from an external device (e.g., a source device), an external storage medium (e.g., a USB memory), an external server (e.g., a web hard), etc. through a communication method such as AP-based Wi-Fi (wireless LAN network), Bluetooth, Zigbee, wired/wireless Local Area Network (LAN), Wide Area Network (WAN), Ethernet, IEEE 1394, High-Definition Multimedia Interface (HDMI), Universal Serial Bus (USB), Mobile High-Definition Link (MHL), Audio Engineering Society/European Broadcasting Union (AES/EBU), Optical, Coaxial, etc.

The input unit may be implemented as a device such as a button, a touch pad, a mouse, and a keyboard, or may be implemented as a touch screen, remote control receiver/transmitter, etc. which can perform not only the above-described display function but also a manipulation input function. The remote control receiver/transmitter may receive a remote control signal from an external remote control device or transmit a remote control signal through at least communication method from among an infrared communication, a Bluetooth communication or a WiFi communication.

The electronic apparatus 100 may further include a tuner and a demodulator according to an embodiment. The tuner (not illustrated) may receive a Radio Frequency (RF) broadcast signal by tuning a channel selected by a user or all pre-stored channels from among RF broadcast signals received through an antenna. The demodulator (not illustrated) may receive and demodulate a digital IF signal (DIF) converted in the tuner and perform channel decoding, etc. According to an embodiment, an input image received through the tuner is processed through the demodulator (not illustrated) and then, may be provided to the processor 140 for image processing according to an embodiment.

Figure 10:
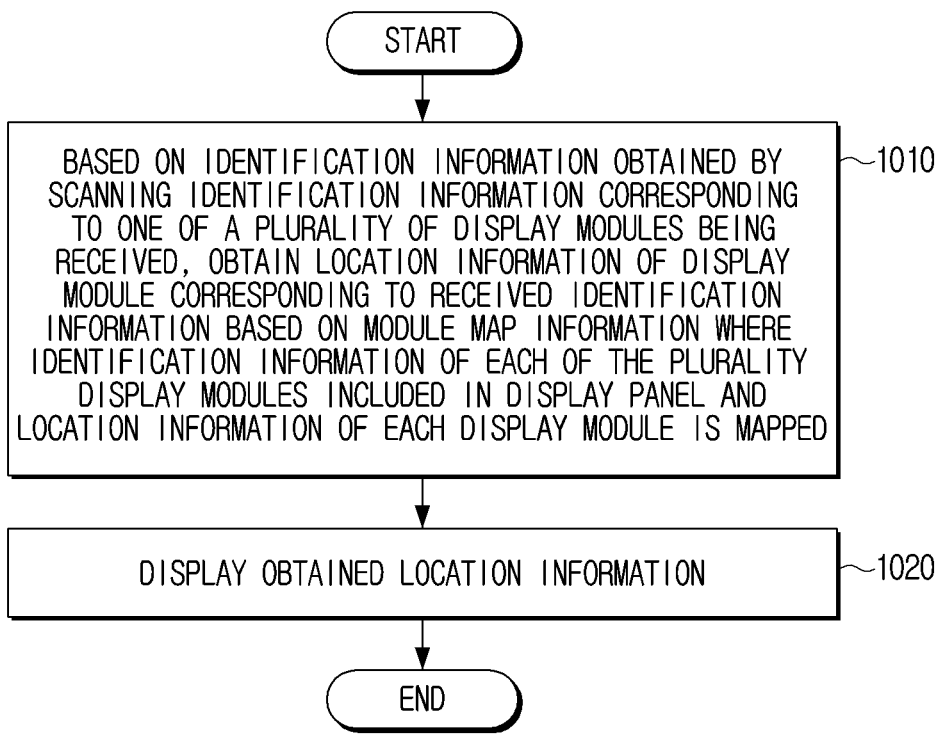
FIG. 10 is a flowchart provided to explain a controlling method of an electronic apparatus according to an embodiment.

FIG. 10 is a flowchart provided to explain a controlling method of an electronic apparatus according to an embodiment.

According to an embodiment, a controlling method of an electronic apparatus including module map information in which identification information of each of a plurality of display modules included in a display panel and location information of each display module is mapped comprises, based on identification information obtained by scanning identification information corresponding to one of the plurality of display modules being received from a sensor, obtaining location information of a display module corresponding to the received identification information based on module map information stored in a memory (S1010).

Subsequently, the obtained location information is displayed (S1020).

Here, the identification information may include at least one of an identification code or an identification number provided on a rear surface of each of the plurality of display modules.

The operation of displaying (S1020) according to an embodiment may comprise displaying location information of a target display module from among the plurality of display modules and displaying guide information including direction information and distance information regarding the location of the target display module with reference to a location obtained based on the location information of the target display module and the obtained location information.

The operation of obtaining (S1010) according to an embodiment may comprise, based on location information regarding a module in which an error occurs from among the plurality of display modules being received from a display panel, identifying the received location information as the location information of the target display module.

The controlling method according to an embodiment may further comprise controlling a display module so that a display module corresponding to the obtained location information displays a specific image.

The controlling method according to an embodiment may further comprise displaying a UI screen including at least one of a UI item for transmitting module map information to an external server, a UI item for receiving the module map information from an external server, a UI item for updating the module map information or a UI item for providing location information of a specific display module from among the plurality of display modules.

The controlling method according to an embodiment may further comprise controlling a display to display a UI including four direction buttons of up, down, left and right, and based on identification information obtained by scanning identification information of a specific display module being received after one of the four direction buttons is input, obtaining location information of the specific display module based on the location information of the current display module and the direction information of the input direction button, and updating module map information by mapping the obtained location information and the obtained identification information.

The module map information according to an embodiment may be information obtained by integrating first module map information including location information of some display modules from among a plurality of display modules obtained by an electronic apparatus and second module map information including location information of the remaining display modules from among the plurality of display modules obtained by another electronic apparatus.

Here, the second module map information may be obtained by another electronic apparatus and transmitted to an external server, or may be received by the electronic apparatus from an external server.

The controlling method according to an embodiment may further comprise, based on information related to an operation of a display module corresponding to the obtained location information being received through a communication interface, displaying the operation-related information.

However, various exemplary embodiments of the present disclosure may be applied not only to the electronic apparatus but also all types of electronic apparatuses having a display.

Meanwhile, the aforementioned various embodiments may be implemented in a computer or a recording medium that can be read by a device similar to a computer by using software, hardware or a combination thereof. In some cases, the embodiments described in this specification may be implemented as a processor itself. Meanwhile, according to implementation by software, the embodiments such as procedures and functions described in this specification may be implemented as separate software modules. Each of the software modules may perform one or more functions and operations described in this specification.

Meanwhile, computer instructions for performing processing operations of devices according to the aforementioned various embodiments of the disclosure may be stored in a non-transitory computer-readable medium. When computer instructions stored in such a non-transitory computer-readable medium are executed by the processor of a specific device, processing operations at the electronic apparatus 100 according to the aforementioned various embodiments are made to be performed by the specific device.

The non-transitory computer-readable medium refers to a medium that stores data semi-permanently, and is readable by a device, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

While preferred embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:
a sensor configured to scan identification information from an external surface;
a display;
a communication interface including a circuit;
a memory to store module map information in which identification information of a plurality of display modules included in an external display apparatus and location information of the plurality of display modules is mapped, respectively; and
a processor configured to:
control the sensor to scan an area including the identification information on a surface of one of the plurality of display modules;
obtain the identification information based on the scanned area,
obtain first location information indicating a location of the display module corresponding to the identification information in an arrangement of the plurality of display modules based on the module map information stored in the memory,
control the display to display the first location information of the display module,
based on second location information indicating a location of a target display module in which an error occurs from among the plurality of display modules being received from the external display apparatus through the communication interface, display the second location information of the target display module, and
control the display to display guide information including direction information and distance information regarding a location of the target display module with reference to the first location information of the display module,
wherein the plurality of display modules are arranged in a matrix form,
wherein the first location information includes a row and a column corresponding to the display module in the external display apparatus, and
wherein the second location information includes a row and a column corresponding to the target display module in the external display apparatus.

2. The apparatus as claimed in claim 1, wherein the identification information includes at least one of an identification code or an identification number respectively provided on a rear surface of the plurality of display modules.

3. The apparatus as claimed in claim 1, further comprising:
wherein the processor is configured to control the display module for which the first location information is obtained based on the identification information scanned from one of the plurality of display modules to display a specific image.

4. The apparatus as claimed in claim 1, wherein the processor is configured to control the display to display a UI screen including at least one of a first UI item for transmitting the module map information to an external server, a second UI item for receiving the module map information from the external server, a third UI item for updating the module map information or a fourth UI item for providing location information of a specific display module from among the plurality of display modules.

5. The apparatus as claimed in claim 1, wherein the processor is configured to control the display to display a UI including four direction buttons of up, down, left and right, and
based on scanned identification information of a specific display module among the plurality of display modules after one direction button from among the four direction buttons being received,
obtain location information of the specific display module based on location information of a current display module among the plurality of display modules and direction information of an input direction button, and
update the module map information by mapping the location information of the specific display module and the identification information.

6. The apparatus as claimed in claim 1, wherein the module map information is information obtained by integrating first module map information including location information regarding some display modules from among the plurality of display modules obtained by the electronic apparatus and second module map information including location information regarding remaining display modules from among the plurality of display modules obtained by another electronic apparatus.

7. The apparatus as claimed in claim 6, further comprising:
a communication interface including a circuit,
wherein the second map information is obtained by the other electronic apparatus and transmitted to an external server, and the second map information is received from the external server through the communication interface.

8. The apparatus as claimed in claim 1, further comprising:
a communication interface including a circuit,
wherein the processor is configured to, based on information related to an operation of the display module corresponding to the first location information being received through the communication interface, control the display to display operation-related information.

9. A method of controlling an electronic apparatus, the method comprising:
storing, in a memory, module map information in which identification information of a plurality of display modules included in an external display apparatus and location information of the plurality of display modules is mapped, respectively;
scanning an area including identification information on a surface of one of the plurality of display modules;
obtaining the identification information on the scanned area;
obtaining first location information indicating a location of the display module corresponding to the identification information in an arrangement of the plurality of display modules based on the module map information stored in the memory;
displaying the first location information of the display module,
based on second location information indicating a location of a target display module in which an error occurs from among the plurality of display modules being received from the external display apparatus, displaying the second location information of the target display module; and
displaying guide information including direction information and distance information regarding a location of the target display module with reference to the first location information of the display module, and
wherein the plurality of display modules are arranged in a matrix form,
wherein the first location information includes a row and a column corresponding to the display module in the external display apparatus, and
wherein the second location information includes a row and a column corresponding to the target display module in the external display apparatus.

10. The method as claimed in claim 9, wherein the identification information includes at least one of an identification code or an identification number respectively provided on a rear surface of the plurality of display modules.

11. The method as claimed in claim 9, further comprising:
controlling the display module for which the first location information is obtained based on the identification information from one of the plurality of display modules to display a specific image.

12. The method as claimed in claim 9, further comprising:
displaying a UI screen including at least one of a first UI item for transmitting the module map information to an external server, a second UI item for receiving the module map information from the external server, a third UI item for updating the module map information or a fourth UI item for providing location information of a specific display module from among the plurality of display modules.

13. The method as claimed in claim 9, further comprising:
controlling the display to display a UI including four direction buttons of up, down, left and right; and
based on scanned identification information from an external surface of a specific display module among the plurality of display modules after one direction button from among the four direction buttons being received, obtaining location information of the specific display module based on location information of a current display module among the plurality of display modules and direction information of an input direction button; and updating the module map information by mapping the location information of the specific display module and the identification information.

14. The method as claimed in claim 9, wherein the module map information is information obtained by integrating first module map information including location information regarding some display modules from among the plurality of display modules obtained by the electronic apparatus and second module map information including location information regarding remaining display modules from among the plurality of display modules obtained by another electronic apparatus.

15. The method as claimed in claim 14, wherein the second map information is obtained by the other electronic apparatus and transmitted to an external server, and the second map information is received from the external server.

16. The method as claimed in claim 9, further comprising:
based on information related to an operation of the display module corresponding to the first location information being received through a communication interface, displaying operation-related information.

* * * * *